United States Patent
Vu

(10) Patent No.: US 12,407,215 B2
(45) Date of Patent: *Sep. 2, 2025

(54) COOLING JACKET FOR ELECTRIC MOTOR HAVING CONFIGURATION FOR REDUCING ELECTROMAGNETIC NOISE

(71) Applicant: VINFAST TRADING AND PRODUCTION JOINT STOCK COMPANY, Hai Phong (VN)

(72) Inventor: Tuan Anh Vu, Hai Phong (VN)

(73) Assignee: VINFAST TRADING AND PRODUCTION JOINT STOCK COMPANY, Hai Phong (VN)

( * ) Notice: Subject to any disclaimer, the term of this patent is extended or adjusted under 35 U.S.C. 154(b) by 245 days.

This patent is subject to a terminal disclaimer.

(21) Appl. No.: 18/080,289

(22) Filed: Dec. 13, 2022

(65) Prior Publication Data
US 2023/0268797 A1 Aug. 24, 2023

(30) Foreign Application Priority Data
Feb. 23, 2022 (VN) .............................. 1-2022-01126

(51) Int. Cl.
- *H02K 5/20* (2006.01)
- *H02K 5/173* (2006.01)
- *H02K 5/24* (2006.01)
- *H02K 9/193* (2006.01)

(52) U.S. Cl.
CPC ............ *H02K 5/24* (2013.01); *H02K 5/1732* (2013.01); *H02K 5/203* (2021.01); *H02K 9/193* (2013.01)

(58) Field of Classification Search
CPC .. H02K 5/00; H02K 5/02; H02K 5/04; H02K 5/06; H02K 5/10; H02K 5/15; H02K 5/17; H02K 5/173; H02K 5/1732; H02K 5/18; H02K 5/20; H02K 5/203; H02K 5/24; H02K 9/00; H02K 9/19; H02K 9/193; H02K 9/22; H02K 9/223; H02K 9/227

See application file for complete search history.

(56) References Cited

U.S. PATENT DOCUMENTS

| 5,627,420 A * | 5/1997 | Rinker | F04D 29/628 310/87 |
| 2009/0127946 A1 * | 5/2009 | Fee | H02K 5/203 310/64 |

FOREIGN PATENT DOCUMENTS

| CA | 2706032 A1 * | 12/2010 | ........... H02K 9/19 |
| JP | 6980070 B1 * | 12/2021 | ........... H02K 9/19 |

* cited by examiner

*Primary Examiner* — Tran N Nguyen
(74) *Attorney, Agent, or Firm* — United One Law Group LLC; Kongsik Kim; Jhongwoo Peck

(57) ABSTRACT

A cooling jacket for an electric motor having a configuration for reducing electromagnetic noise comprises a stator outer housing substantially in the form of a hollow cylinder surrounding the cooling jacket which is also substantially in the form of a hollow cylinder; a stator core in the form of a hollow cylinder located inside the cooling jacket; and a rotor rotatably mounted inside the stator core. The stator outer housing has an end portion configured to form a bearing housing of the motor. The cooling jacket comprises a bearing housing cooling portion and a stator cooling portion; at least one O-ring between the cooling jacket and the stator outer housing, and at least one O-ring between the bearing housing cooling portion and the stator cooling portion; and a gap between the cooling jacket and the stator outer housing.

7 Claims, 15 Drawing Sheets

(Related Art)

(Related Art)

(Related Art)

(Related Art)

(Related Art)

COOLING JACKET FOR ELECTRIC MOTOR HAVING CONFIGURATION FOR REDUCING ELECTROMAGNETIC NOISE

CROSS-REFERENCE TO RELATED APPLICATION

This application claims priority from Vietnamese Application No. 1-2022-01126, filed on Feb. 23, 2022, which is incorporated herein by reference in its entirety.

TECHNICAL FIELD

The present invention relates to a cooling jacket having a configuration for reducing electromagnetic noise.

RELATED ART

The electric motor (powered motor or generator) converts the electrical energy into the mechanical energy and vice versa in power generation mode. The electric motor is mainly assembled from four main assemblies that are stator assembly, rotor assembly, cooling assembly, and motor housing assembly.

Methods of using a cooling jacket for cooling the electric motor is commonly used in the existing known electric motors to dissipate the heat generated by the electric motor. The known cooling jacket is a component that surrounds the stator and has passages that guide the coolant for cooling the stator of the electric motor. During the operation of electric motor, centripetal forces are applied on teeth of the stator core, which generates electromagnetic noise. The cooling jacket is sandwiched between the stator core and the motor housing, therefore it operates as a main guiding passage for electromagnetic noise.

The electric motor having the known cooling jacket configuration as shown in FIG. 1 is used widely in the market. The electric motor comprises a cooling jacket (also referred as a cooling case) 101 which is assembled inside the stator outer housing 102 substantially in the form of a hollow cylinder surrounding the cooling jacket 101; a stator core 103 in the form of a hollow cylinder located inside the cooling jacket 101; a rotor 104 rotatably mounted inside the stator core 103. The stator core 103 is made of steel sheets which is wound around by a plurality of electrical wires. The cooling jacket 101 in the form of a hollow cylinder has a coolant guiding groove 105 that runs along the outer circumference. The cooling jacket 101 is surrounded by the stator outer housing 102, thus forming the coolant guiding passage having a spiral shape between the cooling jacket 101 and the stator outer housing 102.

In such a known cooling configuration, the cooling jacket 101 is friction welded to the inner surface of the stator outer housing 102, thus the coolant between the cooling jacket 101 and the stator outer housing 102 is not leaked to the outside. However, the cooling jacket and the stator outer housing 102 being connected by welding line 106 results in the transfer of vibration from the stator core to the motor housing, which causes the electromagnetic noise level generated by the electric motor is high.

U.S. Ser. No. 10/576,815B2 (see FIGS. 2A and 2B) discloses an electric motor having a housing comprises an inner cylinder 201 and an outer cylinder 202. The inner cylinder 201 has a cylinder shape tapered to one end that allows for press assembling the stator 203 along its inner diameter end. The rotor 204 is rotatably mounted inside the stator 203. The front and rear end side covers 205, 206 having bearings for supporting the axis of the rotor 204 and are assembled to two ends of the motor, wherein the rear end side cover 206 is secured by screws 207. The inner cylinder 201 has a groove 211 that extends along its outer periphery surface and the cone-shaped outer side of the inner cylinder 201 is assembled to the cone-shaped inner side of the outer cylinder 202 thus forming the coolant guiding passage between the inner cylinder 201 and the outer cylinder 202. The inner cylinder 201 has a stopper 208 having a step shape that protrudes inwardly to locate the stator 203.

However, since the cone-shaped outer side of the inner cylinder 201 is press assembled to the cone-shaped inner side of the outer cylinder 202, these sides contacting each other results in an easy transfer of vibration from the stator core to the motor housing, which causes the electromagnetic noise level generated by the electric motor to be high.

The sealing of the coolant is achieved by means of the O-rings 209, 210 which are disposed in the grooves at the outer circumference of the inner cylinder 201. The O-rings 209, 210 are located between the inner cylinder 201 and the outer cylinder 202.

China Utility Model No. CN206759247U (see FIGS. 3A and 3B) discloses an annular motor cooling configuration, which comprises an inner cooling pipe 301 and an outer housing 302. The inner cooling pipe 301 has a cylinder shape and a plurality of annular grooves extending along the outer periphery surface. The outer side of the inner cooling pipe 301 is assembled to the inner side of the outer housing 302 thus forming ring-shaped coolant guiding passages between the inner cooling pipe 301 and the outer housing 302. Each of the ring-shaped coolant guiding passages is connected between the common inlet and the common outlet. The inner cooling pipe 301 has a stopper 303 having a step shape that protrudes inwardly to locate the stator when assembling.

However, since the outer side of the inner cooling pipe 301 is firmly fixed to the inner side of the outer housing 302, these sides contacting each other results in the an easy transfer of vibration from the stator core to the motor housing, which causes the electromagnetic noise level generated by the electric motor is high.

SUMMARY

An objective of the present invention is to solve the above-mentioned problems of the known art, specifically to reduce electromagnetic noise transferred from the stator core to the motor housing.

To achieve the above-mentioned objective, according to an aspect of the invention, there is provided a cooling jacket for electric motor having a configuration for reducing electromagnetic noise, wherein the electric motor comprises a stator outer housing substantially in the form of a hollow cylinder surrounding the cooling jacket which is also substantially in the form of a hollow cylinder; a stator core in the form of a hollow cylinder located inside the cooling jacket; a rotor rotatably mounted inside the stator core, the stator outer housing has an end portion configured to form a bearing housing of the motor, characterized in that the cooling jacket comprises a bearing housing cooling portion and a stator cooling portion; at least one O-ring is provided between the cooling jacket and the stator outer housing, at least one O-ring is provided between the bearing housing cooling portion and the stator cooling portion for preventing leakage of a coolant and reducing transfer of vibration from the stator core to the stator outer housing; and a gap is provided between the cooling jacket and the stator outer housing for reducing transfer of vibration from the stator core to the stator outer housing.

According to an aspect of the present invention, the bearing housing cooling portion is disposed to surround the bearing housing of the motor and has an inner side along the circumference of the inner end of the bearing housing cooling portion tightly assembled with the outer side along the circumference of the inner end of the stator cooling portion to form an unitary unit with the at least one O-ring interposed therebetween to form a seal between the bearing housing cooling portion and the stator cooling portion for preventing the coolant from being leaked from the bearing coolant guiding channel of the bearing housing cooling portion; the stator cooling portion comprises an outer wall located on the outer end side and an inner wall located on the inner end side thereof, first and second partition walls that extend in the spiral shape around the circumference of the stator cooling portion, the first and second partition walls, the outer wall, and the inner wall together define a stator coolant guiding channel; and the stator coolant guiding channel extends from the coolant inlet to the coolant outlet, the coolant outlet is connected to the bearing coolant guiding channel of the bearing housing cooling portion.

According to an aspect of the present invention, the cooling jacket is only connected to the stator outer housing at two ends of the cooling jacket; and wherein the gap between the cooling jacket and the stator outer housing extends from one end to the other end of the stator cooling portion.

According to an aspect of the present invention, the top portions of the first and second partition walls, the splitter, the outer and inner walls do not come into contact with the inner surface of the stator outer housing.

According to an aspect of the present invention, the bearing housing cooling portion comprises an outer wall located on its outer end side and having the same height as that of the bearing coolant guiding channel; an arc-shaped groove formed in the front surface of the bearing housing cooling portion; and a concave groove formed in the inner surface of the stator outer housing to guide the coolant toward the front surface of the bearing housing cooling portion, wherein the concave groove, the circumferential surface of the bearing housing cooling portion, the front surface of the bearing housing cooling portion, and the arc-shaped groove together forms the bearing coolant guiding channel 10.

According to an aspect of the present invention, the bearing coolant guiding channel is located between the outer wall of the bearing housing cooling portion and the inner wall of the stator cooling portion.

According to an aspect of the present invention, the side along the inner circumference of the inner end of the bearing housing cooling portion has a widened portion for engaging with a lowered portion on the side along the outer circumference of the inner end of the stator cooling portion, the lowered portion of the stator cooling portion is provided with a groove along the outer circumference for assembling the O-ring therein so that when the bearing housing cooling portion is engaged with the stator cooling portion, the O-ring is located between the two overlapped engaging ends of the bearing housing cooling portion and the stator cooling portion, thus preventing coolant from leaking from the bearing coolant guiding channel of the bearing housing cooling portion.

According to an aspect of the present invention, the middle section of the stator coolant guiding channel is enlarged, at the middle of the enlarged section there is provided a flow splitter having a shape that corresponds to the enlarged middle section, the flow splitter has the same height as that of the first and second partition walls and the upper surface of the flow splitter is curved to engage with the inner surface of the stator outer housing, wherein the flow splitter is not tightly connected to the inner surface of the stator outer housing, defining a gap between the flow splitter and the inner surface of the stator outer housing for reducing electromagnetic noise.

According to the present invention, the vibration generated by the electromagnetic force is damped and absorbed by the plurality of O-rings that connects the cooling jacket to the stator outer housing.

BRIEF DESCRIPTION OF DRAWINGS

In order to facilitate the understanding of the present invention, a preferred embodiment of the invention, without limiting the invention, will be described with reference to the accompanying drawings, wherein.

DETAILED DESCRIPTION

Figure 1:
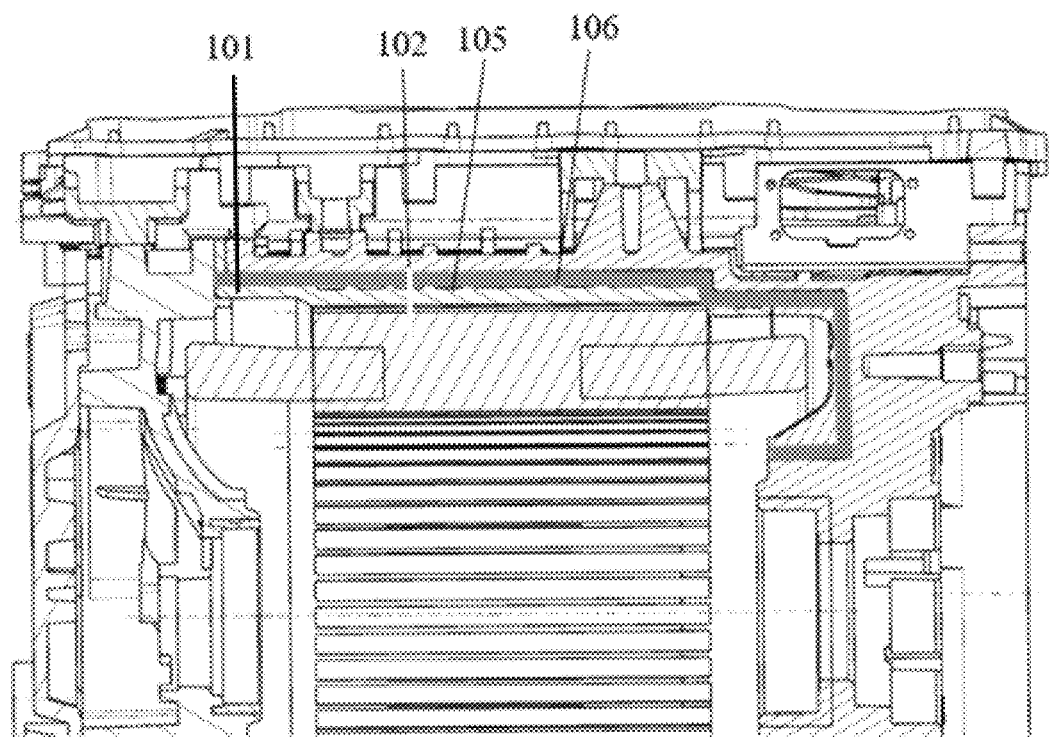
FIG. 1 is a schematic cross-sectional view showing a configuration of a known type of the electric motor.
Figure 2A:
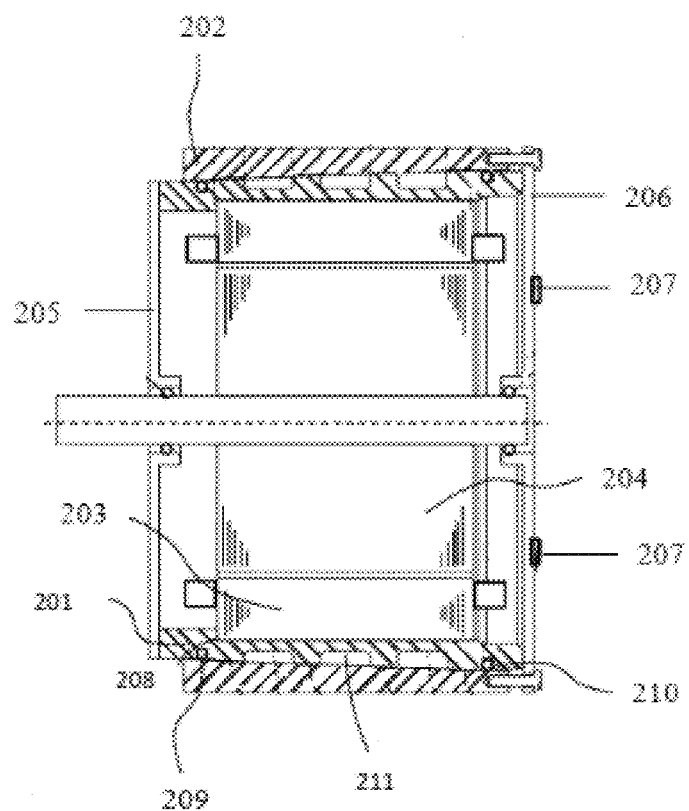
FIG. 2A is a schematic cross-sectional view showing a configuration of another known electric motor.
Figure 2B:
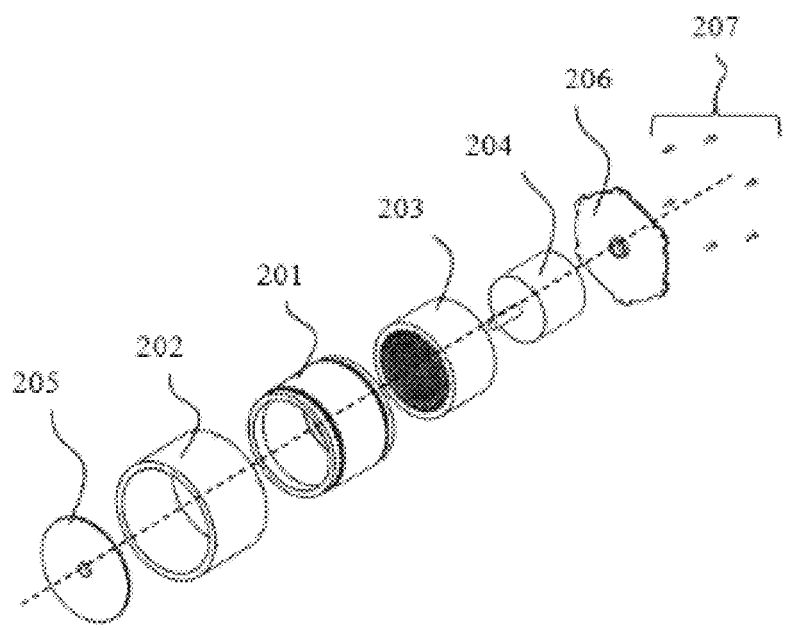
FIG. 2B is an exploded perspective view illustrating a configuration of the known electric motor in FIG. 2A.
Figure 3A:
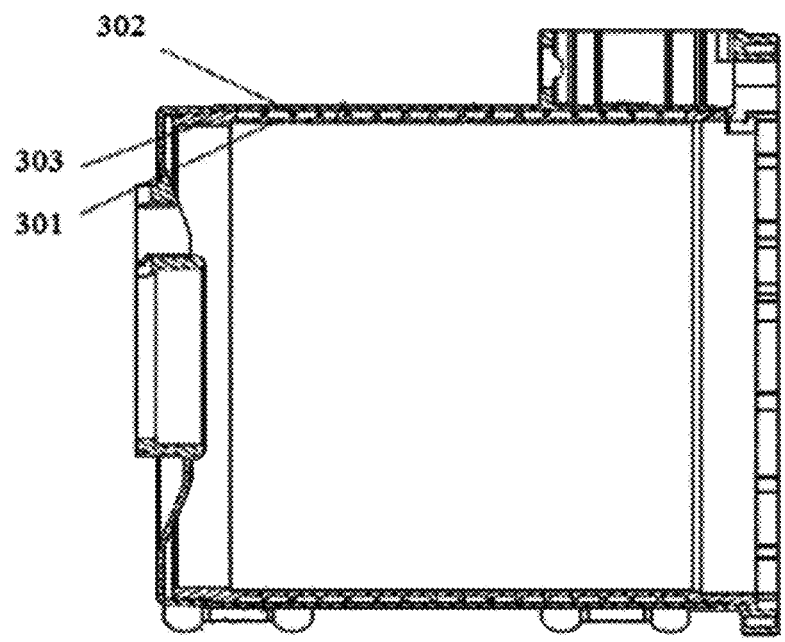
FIG. 3A is a schematic cross-sectional view showing a configuration of a yet another known cooling jacket for electric motor.
Figure 3B:
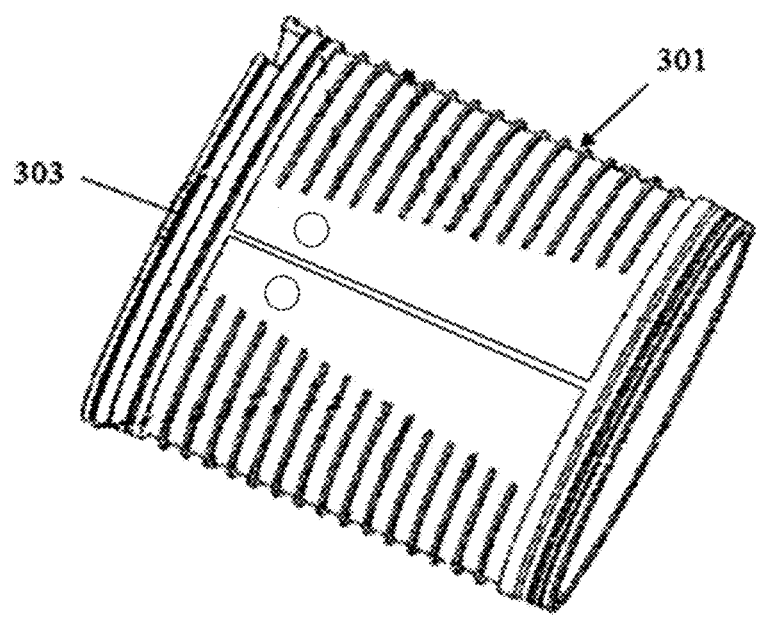
FIG. 3B is a perspective view illustrating a configuration of the known cooling jacket for electric motor in FIG. 3A.

A cooling jacket for electric motor having a configuration for reducing electromagnetic noise according to an embodiment of the invention will be described in detail below.

As used herein, the term "unitary" means one or more parts or members forming or functioning as a single component or object.

As shown in FIGS. 4A-10, an electric motor is provided with a cooling jacket 1 for reducing electromagnetic noise according to the embodiment of the invention, wherein the electric motor comprises a stator outer housing 2 substantially in the form of a hollow cylinder surrounding the cooling jacket 1 which is also substantially in the form of a hollow cylinder; a stator core 3 in the form of a hollow cylinder located inside the cooling jacket 1 and made of steel sheets, a plurality of electrical wires wound around the stator core 3 to form electrical windings; and a rotor 4 rotatably mounted inside the stator core 3.

The stator outer housing 2 has an end portion configured to form a bearing housing 22 of the motor. According to another embodiment, the bearing housing may be manufactured as a separate unit. A concave groove 23 is formed in the inner surface of the stator outer housing 2 to guide the coolant toward the front surface of the bearing housing cooling portion A.

The cooling jacket 1 comprises a bearing coolant guiding channel 10, a coolant guiding channel 14 located between the cooling jacket 1, a stator outer housing 2, and a plurality of O-rings 5, 6 that seals the coolant. The stator outer housing 2 has an inner surface that is configured to contact with the outer surface of the cooling jacket 1. The configuration of the cooling jacket 1 will be described in more detail below.

As shown in FIGS. 5-10, the cooling jacket 1 having a configuration for reducing electromagnetic noise according to the embodiment of the present invention comprise a bearing housing cooling portion A and a stator cooling portion B, and a plurality of O-rings 5, 6.

Figure 4A:
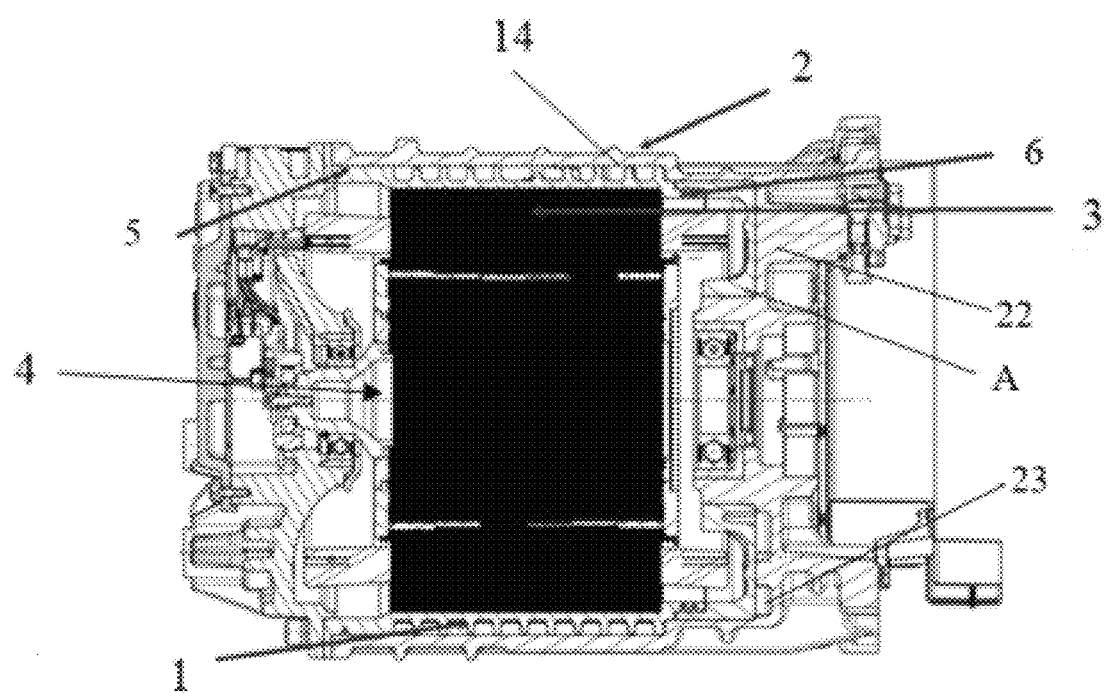
FIG. 4A is a schematic cross-sectional view of the electric motor using the cooling jacket according to an embodiment of the invention.
Figure 4B:
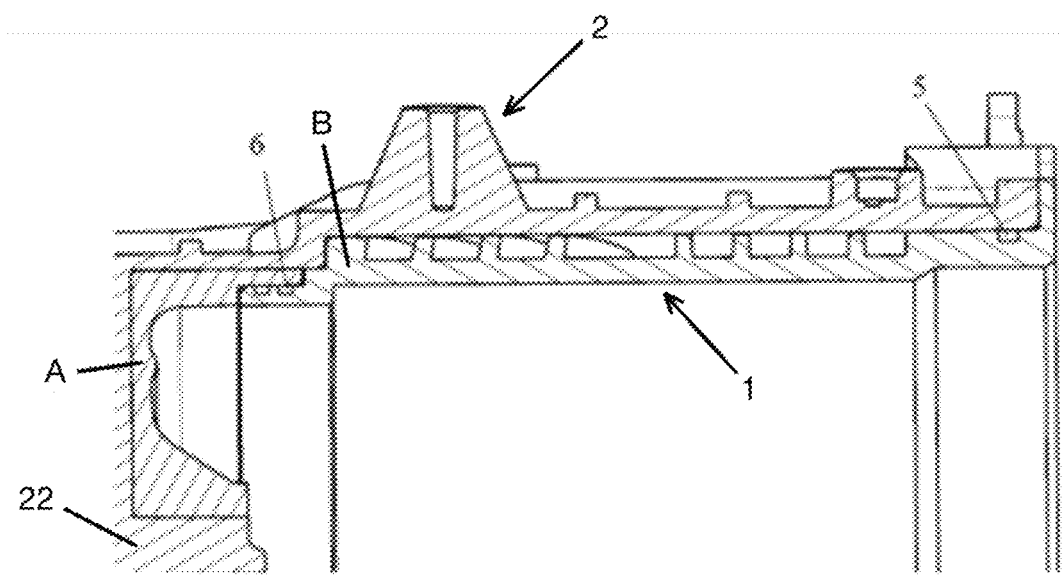
FIG. 4B is an enlarged schematic cross-sectional view of the electric motor using the cooling jacket according to the embodiment of the invention.
Figure 5:
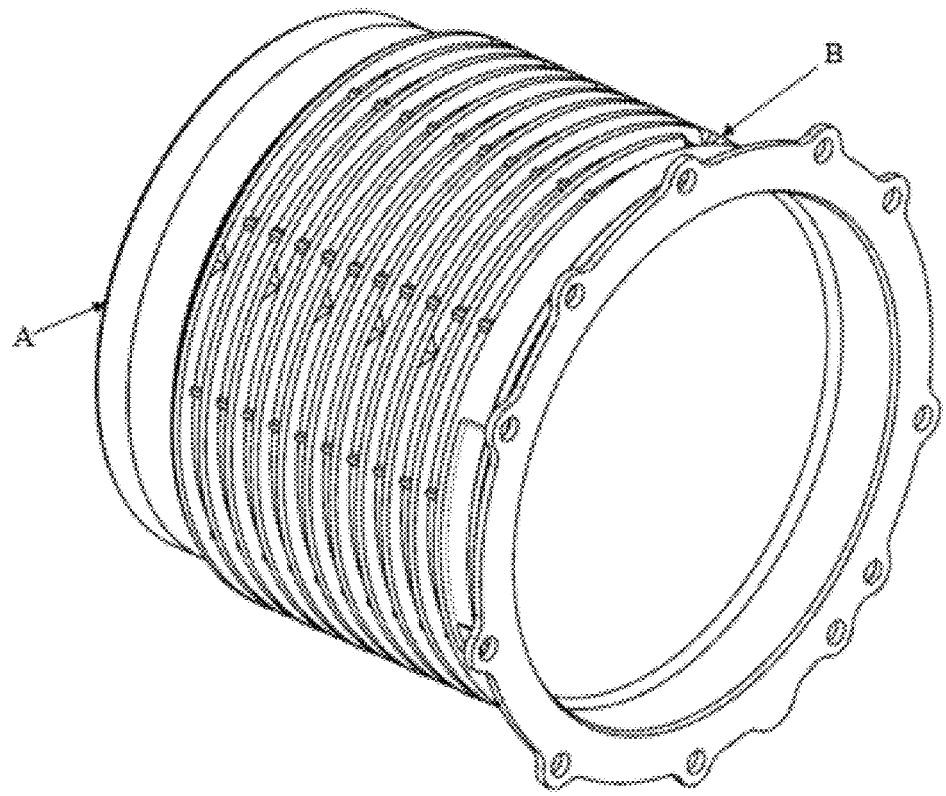
FIG. 5 is a perspective view illustrating a configuration of the cooling jacket according to the embodiment of the invention
Figure 9:
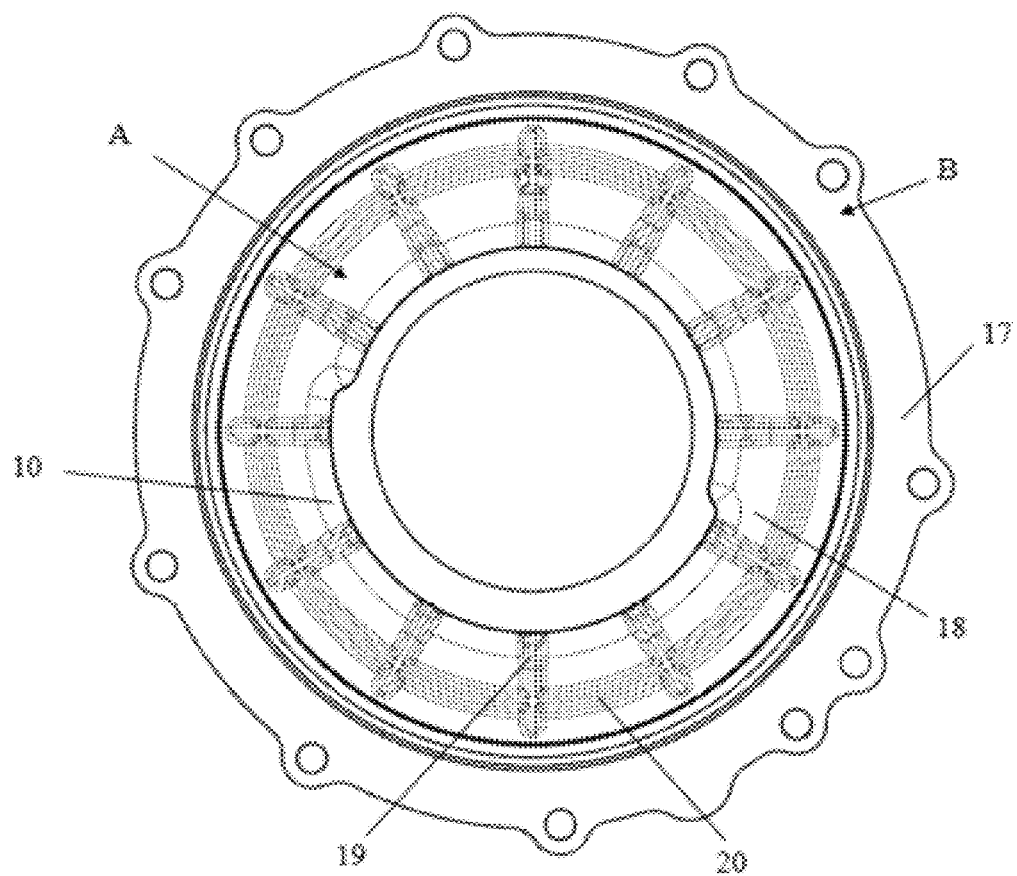
FIG. 9 is a schematic rear view of FIG. 8 showing the cooling jacket according to the embodiment of the invention.

The bearing housing cooling portion A has an outer wall 9 located on the outer end side 18 (i.e., the left side in the drawings) and the bearing coolant guiding channel 10. According to the preferred embodiment shown in FIGS. 5-8 and 10, the outer wall 9 may have the same height as that of the bearing coolant guiding channel 10. As shown in FIGS. 9, the outer end side 18 (i.e., the left side in the drawings) of the bearing housing cooling portion A is extended inwardly in the axial direction to cover the rotor axis supporting bearing of the motor. As shown in FIGS. 4 and 9, the front surface of the bearing housing cooling portion A is provided with an arc-shaped groove 101A so that the coolant, after flowing across the outer wall 9 toward the front surface of the bearing housing cooling portion A, may flow into the arc-shaped groove 101A to increase the bearing housing 22 cooling effect. The concave groove 23 in the inner surface of the stator outer housing 2, the circumferential surface of the bearing housing cooling portion A, the front surface of the bearing housing cooling portion A, and the arc-shaped groove 101A together forms the bearing coolant guiding channel 10. The coolant, after flowing through the bearing coolant guiding channel 10, may be discharged to the outside through the coolant discharging pipe (not shown).

However, the present invention is not limited to this embodiment. According to an embodiment, the bearing coolant guiding channel 10 is a portion that has a lower height than that of the outer wall 9, and is disposed between the outer wall 9 and the inner wall 12 of the stator cooling portion B. The bearing coolant guiding channel 10 runs along the circumference of the bearing housing cooling portion A.

Further, the bearing housing cooling portion A is disposed to surround the bearing housing 22 of the stator outer housing 2 and manufactured separately from the stator cooling portion B, this separately manufacturing is for the purpose of decreasing the noise and vibration. The bearing housing cooling portion A is secured to the stator cooling portion B to form a unitary unit with the O-ring 6 that seals between the bearing housing cooling portion A and the stator cooling portion B to prevent the coolant from being leaked. Preferably, the number of O-rings 6 is two. However, the number of O-rings 6 is not limited to this embodiment and other number of O-rings may be used.

Figure 6:
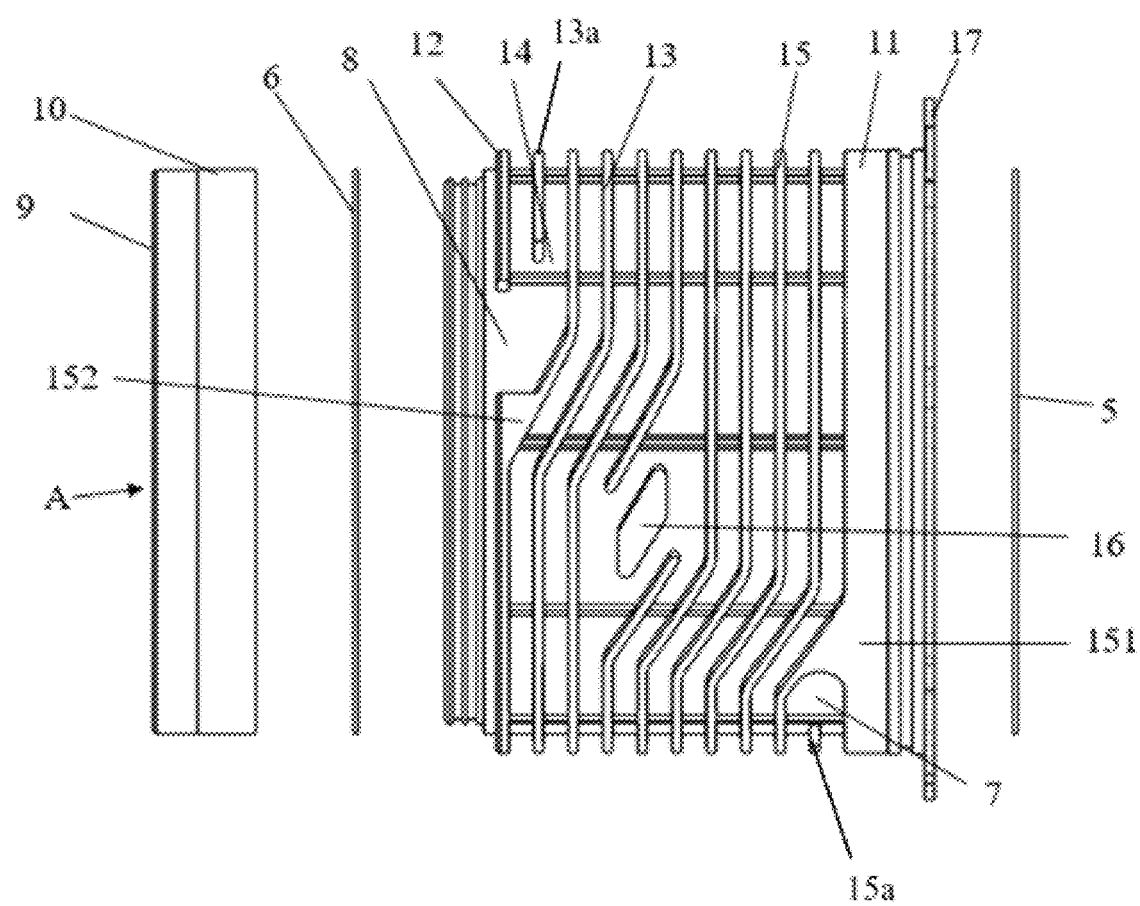
FIG. 6 is a schematic exploded elevation view of the cooling jacket according to the embodiment of the invention.
Figure 7:
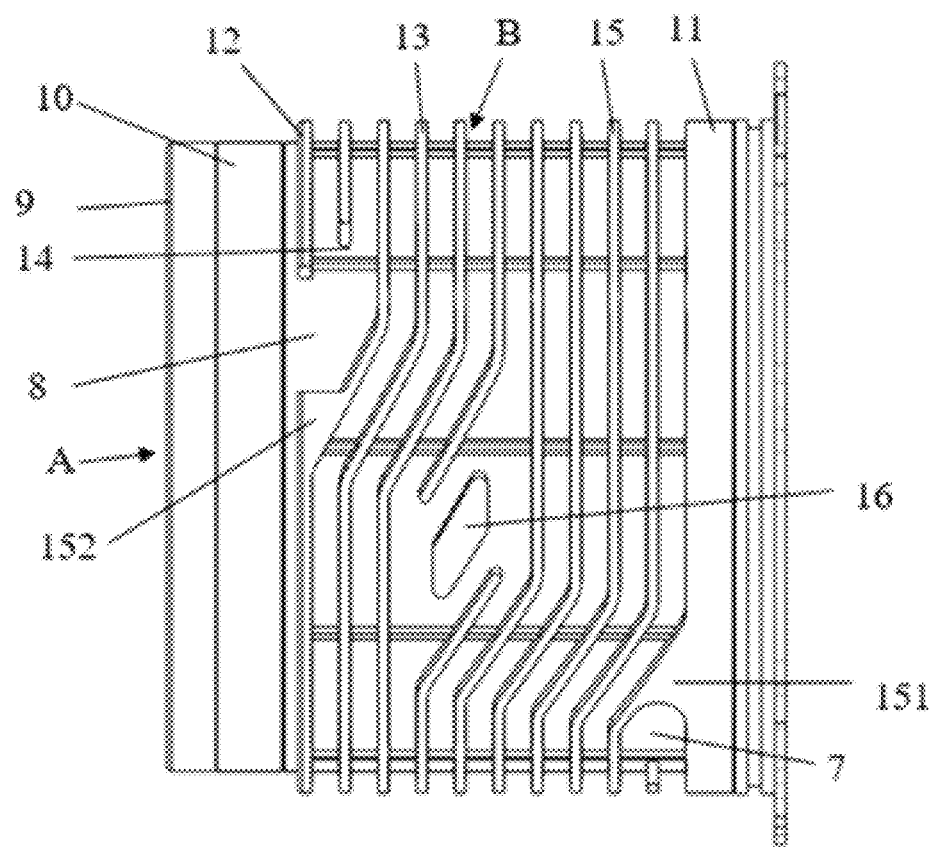
FIG. 7 is a schematic elevation view of the cooling jacket according to the embodiment of the invention.
Figure 8:
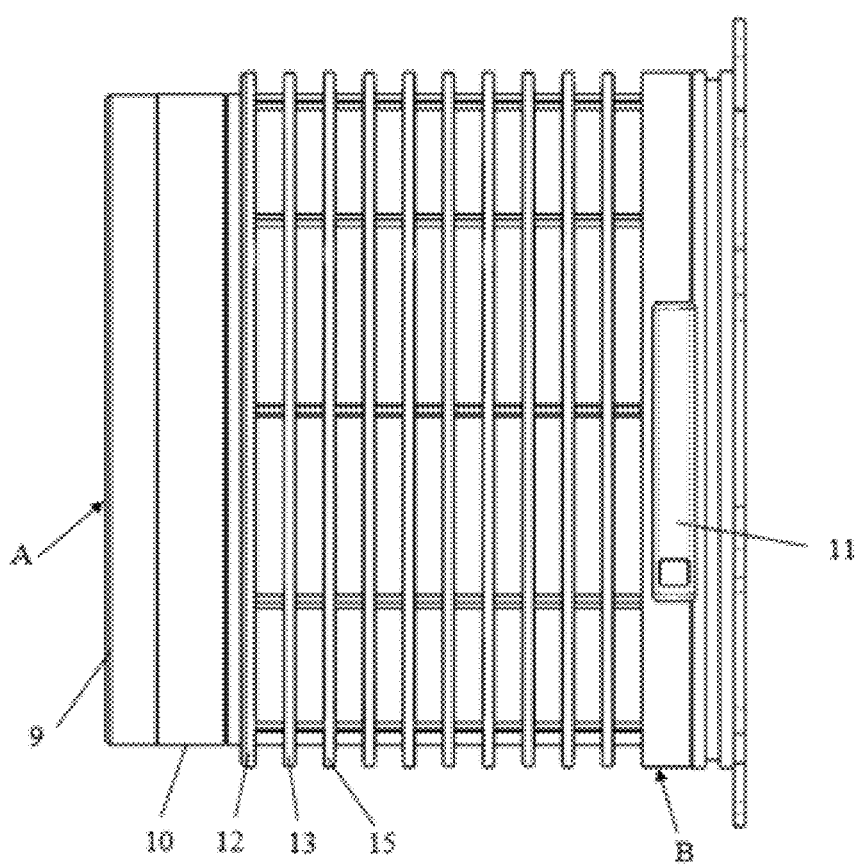
FIG. 8 is another schematic elevation view of the cooling jacket according to the embodiment of the invention.
Figure 10:
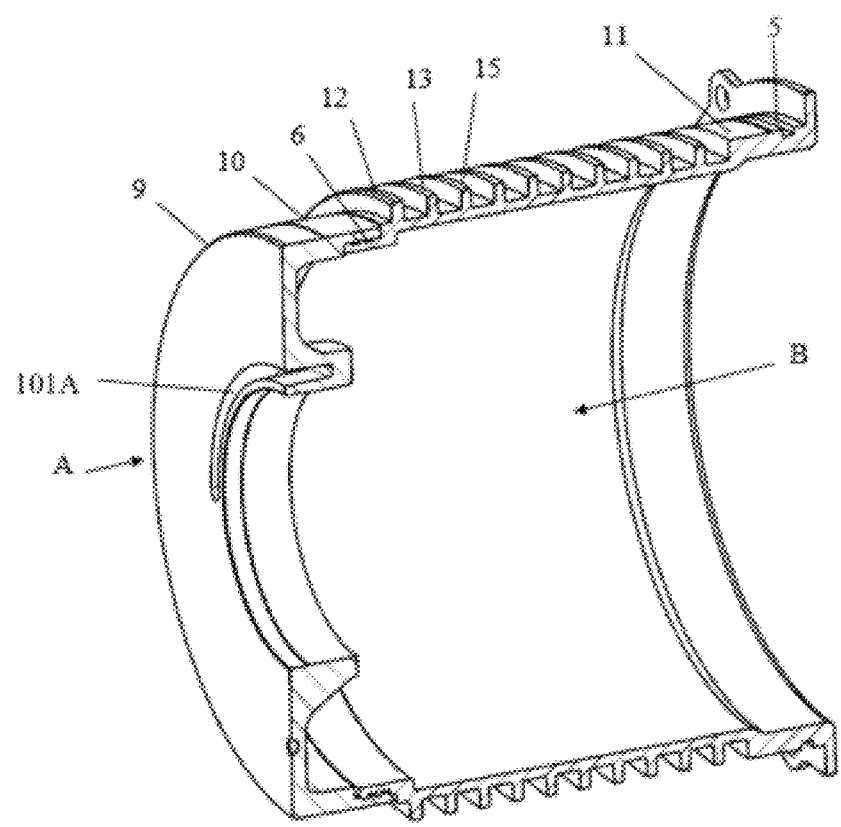
FIG. 10 is a schematic perspective cross-sectional view of the cooling jacket according to the embodiment of the invention.

In particular, the side along the inner circumference of the inner end of the bearing housing cooling portion A (see the right end of the bearing housing cooling portion A of FIGS. 6 and 10) has a widened portion for engaging with the lowered portion on the side along the outer circumference of the inner end of the stator cooling portion B (see the left end of the stator cooling portion B of FIGS. 6 and 10). The lowered portion of the stator cooling portion B is provided with a groove along the circumference for fitting of the O-ring 6 therein. Thus, when the bearing housing cooling portion A is engaged with the stator cooling portion B, the O-ring 6 is located between two overlapped engaging ends of the bearing housing cooling portion A and the stator cooling portion B thus preventing coolant from being leaked from the bearing coolant guiding channel 10.

Referring to FIGS. 5-10, the stator cooling portion B comprises an outer wall 11 located on the outer end side (i.e., the right side in the drawings) and an inner wall 12 located on the inner end side (i.e., left side in the drawings). The first and second partition walls 13 and 15 extend from the outer wall 11 and the inner wall 12, respectively, in a spiral shape around the circumference of the stator cooling portion B, wherein the outer wall 11, the inner wall 12, partition walls 13 and 15 are in hermetically contact with the inner surface of the stator outer housing 2 so that the coolant cannot pass through them. The first and second partition walls 13 and 15, the outer wall 11 and the inner wall 12 together form a stator coolant guiding channel 14.

The stator coolant guiding channel 14 extends from the coolant inlet 7 to the coolant outlet 8. The coolant outlet 8 is connected to the bearing coolant guiding channel 10 of the bearing housing cooling portion A. The middle section of the stator coolant guiding channel 14 is enlarged, at the middle of the enlarged section there is provided a flow splitter (16) having a shape that corresponds to the shape of the enlarged middle section.

According to the embodiment, the middle section of the stator coolant guiding channel 14 is enlarged, the enlarged section is substantially in the diamond shape when being viewed in the radial direction. At the middle of the enlarged section there is provided a flow splitter 16 that is substantially in the diamond shape when being viewed in the radial direction. However, the present invention is not limited to this embodiment, and any other shapes, such as ellipse, may be used. The flow splitter 16 has the same height as that of the partition walls 13 and 15, the upper surface of the flow splitter 16 is curved to hermetically contact with the inner surface of the stator outer housing 2, thus the coolant cannot pass through.

Figure 11:
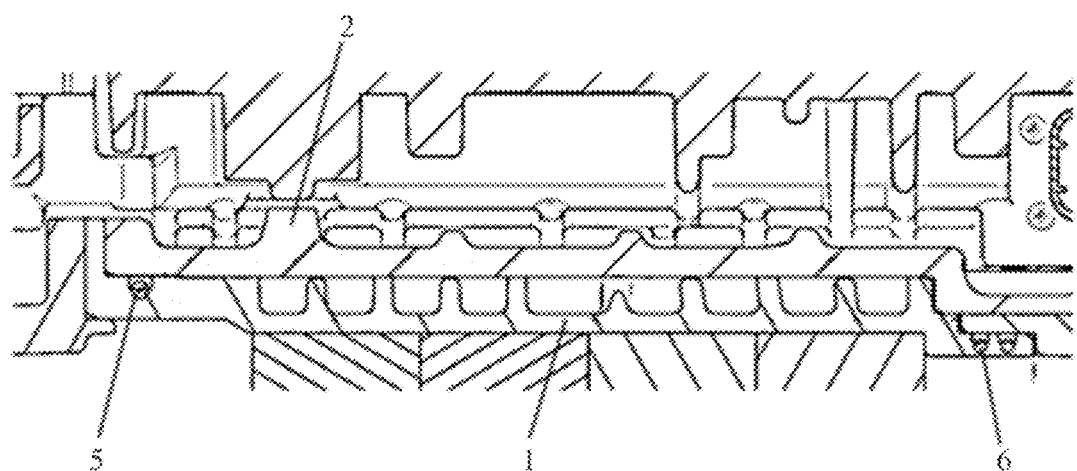
FIG. 11 is an enlarged schematic cross-sectional view illustrating the connection between the cooling jacket and the stator outer housing according to another embodiment of the invention.

Referring to FIG. 11, according to another embodiment, in order to reduce the vibration generated by the electromagnetic force more efficiently, a gap is provided between the cooling jacket 1 and the stator outer housing 2. Accordingly, only a part of the cooling jacket 1 is connected to the stator outer housing 2. The remaining part of the cooling jacket 1 is separate from the stator outer housing 2. Preferably, the part of the cooling jacket 1 connected to the stator outer housing 2 is at two ends of the cooling jacket 1. However, the invention is not limited to this embodiment and the cooling jacket 1 may be connected to the stator outer housing 2 at one end of the cooling jacket 1. More preferably, the part of the cooling jacket 1 is connected to the stator outer housing 2 by welding. The gap between the cooling jacket 1 and the stator outer housing 2 extends from one end to the other end of the stator cooling portion B. Beside using the O-rings 5 and 6 and dividing the cooling jacket 1 into the bearing housing cooling portion A and stator cooling portion B, the gap between the cooling jacket 1 and the stator outer housing 2 helps further reducing vibration transferred from the stator core 3 to the stator outer housing 2.

Figure 12:
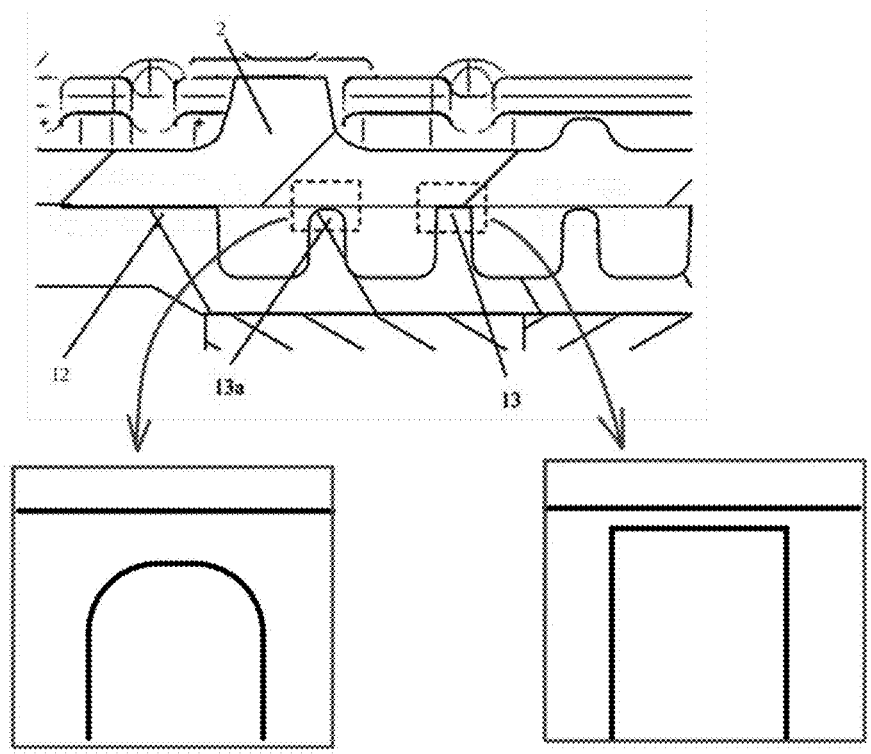
FIG. 12 is an enlarged schematic cross-sectional view illustrating the gap between the cooling jacket and the stator outer housing according to another embodiment of the invention.

Referring to FIGS. 6 and 12, according to another embodiment, the top portions of the first and second partition walls 13, 15, the splitter 16, the outer and inner walls 11, 12 do not come into contact with the inner surface of the stator outer housing 2. Thus, there are gaps between the top portions of the first and second partition walls 13, 15, the splitter 16, the outer and inner walls 11, 12 and the inner surface of the stator outer housing 2.

According to another embodiment, at the middle of the stator coolant guiding channel 14 there are provided a first middle rib 13a and a second middle rib 15a that extend in the spiral shape around the circumference of the stator cooling portion B. The second middle rib 15a extends substantially parallel with the second partition wall 15 from the coolant inlet 7 to a position located between the second partition wall 15 and a side surface of the flow splitter 16. The first middle rib 13a extends substantially parallel with the first partition wall 13 from a position located between the first partition wall 13 and an opposite side surface of the flow splitter 16 to the coolant outlet 8. The first middle rib 13a and a second middle rib 15a have a height lower than the height of the first and second partition walls 13, 15.

According to the embodiment, the O-ring 5 forms a seal between the stator cooling portion B and the stator outer housing 2 for preventing the coolant from being leaked.

When the electric motor using the cooling jacket 1 according to the present invention operates, the coolant is introduced from the coolant inlet 7 of the cooling jacket 1, follows the stator coolant guiding channel 14 to the coolant outlet 8 in order to flow through the bearing coolant guiding channel 10 to the outside through the coolant discharging pipe (not shown). The fluid passage circulates in the aforementioned manner allows the coolant to flow from inlet to outlet with optimal velocity according to this configuration and takes away the heat via forced convection heat transfer mechanism.

According to the present invention, a cooling jacket is provided for electric motor having a configuration that is capable of avoiding contact between the cooling jacket and the stator outer housing, reducing the transfer of vibration from the stator core to the stator outer housing, by connecting the cooling jacket to the stator outer housing using the plurality of O-rings instead of welding connection. Therefore, the electromagnetic noise level is reduced significantly.

The invention claimed is:

1. A cooling jacket for an electric motor having a configuration for reducing electromagnetic noise, wherein the electric motor comprises a stator outer housing that is substantially a hollow cylinder surrounding the cooling jacket that is also substantially a hollow cylinder; a stator core that is a hollow cylinder located inside the cooling jacket; and a rotor rotatably mounted inside the stator core, and wherein the stator outer housing has an axial end portion configured to form a bearing housing of the electric motor, the cooling jacket comprising:
a bearing housing cooling portion and a stator cooling portion; and
at least one first O-ring provided between the cooling jacket and the stator outer housing, and at least one second O-ring provided between the bearing housing cooling portion and the stator cooling portion for preventing leakage of a coolant and reducing transfer of vibration from the stator core to the stator outer housing,
wherein a gap is provided between the cooling jacket and the stator outer housing for reducing transfer of vibration from the stator core to the stator outer housing,
wherein the stator cooling portion comprises:
a first wall disposed proximate to a first axial end of the stator cooling portion;
a second wall disposed proximate to a second axial end of the stator cooling portion;
at least one set of partition walls arranged between the first wall and the second wall to form a helical shape around an outer circumferential surface of the stator cooling portion, and
wherein the first wall, the second wall, and the least one set of partition walls together define a stator coolant guiding channel.

2. The cooling jacket of claim 1, wherein the bearing housing cooling portion is disposed to surround the bearing housing of the electric motor with an inner circumferential surface of the bearing housing cooling portion abutting the outer circumferential surface of the first axial end of the stator cooling portion to form an unitary unit with the at least one second O-ring interposed between the inner circumferential surface of the bearing housing cooling portion and the outer circumferential surface of the first axial end of the stator cooling portion to form a seal between the bearing housing cooling portion and the stator cooling portion for preventing the coolant from leaking.

3. The cooling jacket of claim 1, wherein the cooling jacket is only connected to the stator outer housing at two axial ends of the cooling jacket, and
wherein the gap between the cooling jacket and the stator outer housing extends from the first axial end to the second axial end of the stator cooling portion.

4. The cooling jacket of claim 1, wherein a radial outer portion of each of the at least one set of partition walls, a flow splitter, the first wall, and the second wall that define the stator coolant guiding channel do not abut with an inner circumferential surface of the stator outer housing.

5. The cooling jacket of claim 1, wherein the bearing housing cooling portion comprises:
a first wall located on a first axial end of the bearing housing cooling portion; and
an arc-shaped groove formed in a front surface of the bearing housing cooling portion,
wherein a concave groove is formed in an inner surface of the stator outer housing to guide the coolant toward the front surface of the bearing housing cooling portion, and
wherein the concave groove, an outer circumferential surface of the bearing housing cooling portion, the front surface of the bearing housing cooling portion, and the arc-shaped groove together form a bearing coolant guiding channel.

6. The cooling jacket of claim 1, wherein an inner circumferential surface of a second axial end of the bearing housing cooling portion has a widened portion for engaging with a narrowed portion formed in the stator cooling portion on the outer circumferential surface of the first axial end of the stator cooling portion, wherein the narrowed portion of the stator cooling portion is provided with a groove along the outer circumferential surface for assembling the at least one second O-ring therein so that when the bearing housing cooling portion is engaged with the stator cooling portion, the at least one second O-ring is located between overlapped engaging ends of the bearing housing cooling portion and the stator cooling portion thus preventing the coolant from leaking from a bearing coolant guiding channel formed in the bearing housing cooling portion.

7. The cooling jacket of claim 5, wherein the stator coolant guiding channel includes a coolant inlet and a coolant outlet, and wherein the coolant outlet is connected to the bearing coolant guiding channel of the bearing housing cooling portion to allow the coolant to flow from the stator coolant guiding channel to the bearing coolant guiding channel.

\* \* \* \* \*